Oct. 7, 1958
J. C. VAN RIJN
2,855,141
TWO-PIECE CANTILEVER FAN AND MOTOR
Filed Nov. 25, 1955
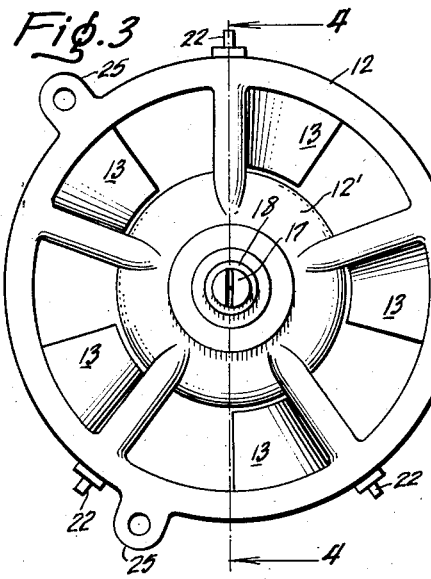
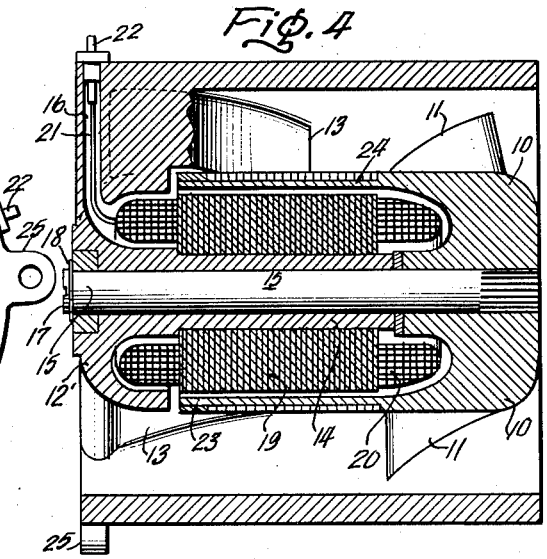
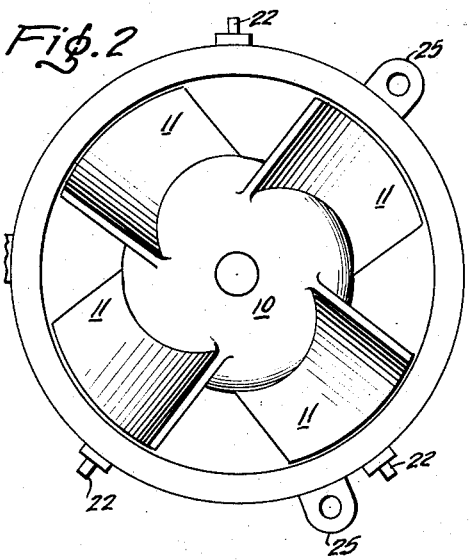
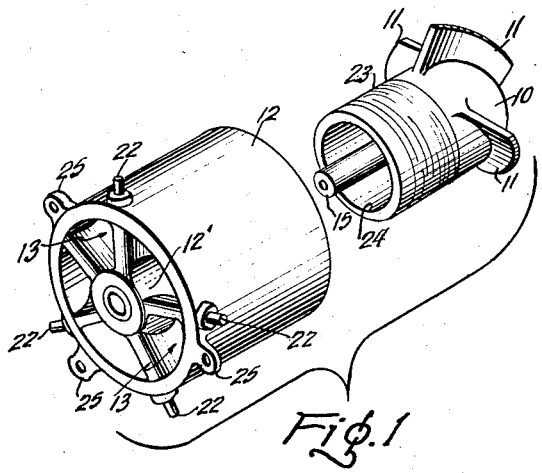
INVENTOR.
Jacobus Constant van Rijn
BY
Andros and Smith
His Attorneys

United States Patent Office 2,855,141
Patented Oct. 7, 1958

2,855,141
TWO-PIECE CANTILEVER FAN AND MOTOR

Jacobus C. Van Rijn, Woodstock, N. Y.

Application November 25, 1955, Serial No. 549,104

4 Claims. (Cl. 230—117)

This invention relates to a two-piece inside-out cantilever motor, especially for motor driven fans or blowers.

An object of the invention is to provide a two-piece motor for a fan or blower, more specifically a fan or blower motor in which the armature rotates and the stator of the motor is supported by a cantilever construction centrally of the motor and surrounded by the rotor so that the motor may be described as an "inside-out" motor.

A further object of the invention is to provide a fan in which the rotor, the rotating shaft and the air impeller blades form one piece.

A still further object of the invention is to provide a fan or blower in which the stator support or arbor, air straighteners, and enveloping barrel or housing are of one piece so that there is no difficulty in bringing the lead wires from the stator to be connected to a source of electric power.

One advantage of the structure of the present invention is that unusually good motor cooling is provided and a further advantage is that the motor can be dissembled and serviced by the loosening of a single fastener.

Other and further objects and advantages of the device will be clear from the following specifications, taken with the accompanying drawing in which like characters of reference refer to like parts in the several views, and in which:

Fig. 1 is an exploded view of the device;

Fig. 2 is an end view of the assembled device as seen from the right hand end of Fig. 1;

Fig. 3 is an end view of the assembled device seen from the left hand end of Fig. 1; and Fig. 4 is a cross sectional view of the device taken on line 4—4 of Fig. 3.

Referring to Fig. 1, the rotary element of the device is constructed in one piece and includes a hub, 10, fan blades, 11, and the skirt portion 23, 24, forming the motor armature.

The mechanical support of the device is constructed in one piece and includes housing, 12, and 12', which may include mounting lugs 25, guide blades or supporting elements 13 acting as spokes to support a motor end cover and a cantilever shaft and stator support arbor, 14, and stator assembly, 19, 20.

As will be clearly seen in Fig. 4, a shaft, 15, is mounted and fixed in rotary element 10. This shaft is cast or fitted into the assemblage 10, 11, 23, 24, to form a unitary structure.

Shaft 15 extends through the cantilever support 14 which may act as a bearing or in which any appropriate bearings such as ball or roller bearings may be mounted. An appropriate thrust collar may be provided between rotor 10 and shaft support arbor 14. Shaft 15 may be held in arbor 14 against axial displacement by any suitable means such as a screw, 17, and washer, 18. Snap ring means could be used instead of the screw and washer to secure the shaft in place.

Stator 19 and windings 20 are rigidly mounted on the stator support 14, and leads 21 from the stator winding pass through passages 16 in the guide blades 13 to terminals 22.

Rotary element 10 is provided with a skirt portion, 23, comprising the usual laminations and the electrical rotor bars 24 of the motor. These rotor bars 24 may be cast, or otherwise integrally secured with hub 10, blades 11 and shaft 15 into a single assemblage, preferably either centrifugally or die cast of high-conductivity aluminum alloy. The specific materials used or the specific methods of manufacture are, however, not the subject of the present invention.

In an alternative structure the shaft 15 could be fixed in cantilever support 14 and hub 10 rotatably mounted on the outboard end. If this alternative arrangement were used the screw 17 and washer 18 would be used on the right hand end of shaft 15 in Fig. 4.

Dissipation of the heat induced by electric induction into the rotor 10, 23, 24, by the stator, 19, 20, will be very efficient due to the fact that the exterior surfaces of the rotor are in continuous contact with air or gas moved by the blades, and the blades themselves act as heat dissipating fins.

It will be seen therefore that the entire fan comprises, in effect, only two elements, the rotor 10, including rotor bars 24; and the mechanical support or housing 12, including blades 13, cantilever stator support 14 and stator assembly, 19, 20. This two element construction is of course of great advantage in the original fabrication of the device and also in servicing the device.

Due to the cantilever construction of the stator support 14, dissambly of the device is unusually easy requiring only the removal of screw 17 and washer 18. This disassembly, it will be noted, does not disturb the electrical connections 21, to the stator windings 20. This construction eliminates the need of slip rings or other sliding contacts since the stator windings, although centrally located, do not rotate, and the armature, which requires no electric leads, is the rotating element.

The cantilever inside-out construction further makes it possible to reduce the assemblage to the very minimum of size and weight while capable of developing a maximum of air flow. Such a device for use in cooling the radio tubes in an airplane where space is at a premium and weight must be kept down, is two inches in diameter and weighs only four ounces.

The fan blades 11 are shown in the drawing as being of the propeller type. Clearly, however, other types of air moving blades could be used with advantage in special installations.

It will thus be seen that the objects hereinbefore set forth may readily and efficiently be attained and, since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention what I claim as new and desired to secure by Letters Patent is:

1. An axial flow fan consisting of two assemblages, the first assemblage comprising a generally cylindrical casing having guide vanes extending inwardly therefrom, an arbor, a portion of said vanes at one end of said casing merging into and supporting one end of said arbor concentric with said casing and extending with its free end toward the other end of said casing, a portion of said guide vanes extending from said one end of said casing toward the other end of said casing, being spaced from said arbor, a stator assembly mounted about said arbor and spaced radially inwardly from said guide vanes; the second assemblage comprising a shaft rotatably mounted in said arbor, a hub at one end of said shaft adjacent to the free end of said arbor, said hub being fitted onto said shaft and having fan blades extending radially therefrom, and a cylindrical armature extending axially of said shaft and being formed as part of said hub surrounding said shaft, said cylindrical armature extending between said stator assembly and said guide vanes to form the inner wall of an annular air flow passage bounded on the outer side by said casing, and releasable means to restrain said shaft from axial motion in said arbor mounted on said shaft remote from said hub.

2. The device of claim 1 in which at least two of said guide vanes form conduits through which electrical wires pass from said stator assembly to the exterior of said cylindrical casing.

3. The device of claim 1 in which said cylindrical casing is of the same length as said rotatable shaft whereby said hub is within said casing and said means to restrain said shaft is readily accessible.

4. An axial flow fan consisting of two assemblages, the first assemblage comprising a generally cylindrical casing having supporting means extending inwardly therefrom, an arbor, a portion of said supporting means at one end of said casing merging into and supporting one end of said arbor concentric with said casing, said arbor extending with its free end toward the other end of said casing, a stator assembly mounted about said arbor and spaced radially inwardly of said casing; the second assemblage comprising a shaft rotatably mounted in said arbor, a hub at one end of said shaft adjacent the free end of said arbor, said hub being fitted on said shaft and having fan blades extending radially therefrom, and a cylindrical armature extending axially of said shaft and formed as part of said hub surrounding said shaft, said cylindrical armature extending between said stator assembly and said casing to form the inner wall of an annular air flow passage bounded on the outer side by said casing, and releasable means to restrain said shaft from axial motion in said arbor mounted on said shaft remote from said hub.

References Cited in the file of this patent

UNITED STATES PATENTS

| | | |
|---|---|---|
| 2,048,421 | Ballentine | July 21, 1936 |
| 2,488,945 | Troller et al. | Nov. 22, 1949 |
| 2,538,196 | Hildebrand et al. | Jan. 16, 1951 |